Patented Dec. 26, 1933

1,941,285

UNITED STATES PATENT OFFICE 1,941,285

TITANIUM SULPHATE COMPOUNDS

Ludwig Teichmann and Hermann Noerr, Leverkusen-on-the-Rhine, Germany, assignors to I. G. Farbenindustrie Aktiengesellschaft, Frankfort-on-the-Main, Germany, a corporation of Germany No Drawing. Application December 27, 1929, Serial No. 417,000, and in Germany January 2, 1929

2 Claims. (Cl. 23—117)

The present invention relates to new titanium sulphate compounds and more particularly to new tanning agents containing titanium sulphate of a determined basicity.

We have found that such titanium sulphate preparations as contain about 0.3 to 0.5 mols of sulphuric acid upon one mol. of titanium dioxide are very valuable tanning agents and media for weighting artificial and natural silk. The use of titanium salts for tanning is old, but heretofore it has not been observed that well tanned leathers are only obtainable when such preparations are used the acid content of which is reduced in such a way that only about 0.3 to 0.5 mols of sulphuric acid are present for each mol. of titanium dioxide.

The products in question are obtainable, for instance, by starting with solutions derived from a decomposition of a titanium ore (ilmenite) with sulphuric acid which contain about 1 mol. of sulphuric acid to 1 mol. of titanium dioxide. By neutralization of a part of the sulphuric acid bound to the titanium by means of an alkali such as ammoniacal water, sodium hydroxide or carbonate, lyes are obtainable from which a solid, easily water-soluble preparation is quickly obtainable having excellent tanning and weighting properties. By evaporation of the solutions the new titanium preparations are obtainable in a solid form. They form white, glass-like masses, which are easily pulverizable or also crystals, which are easily soluble in water. In a technical manner this preparation is obtainable by evaporation of the watery solutions in vacuo or on a drying roller. Instead of preparing the solid preparation it is also possible to prepare concentrated solutions.

Variations in the content of alkali metal sulphate (which forms in the preparation during neutralization) scarcely influence the tanning and weighting properties of the preparation; but the formation and presence of alkali metal sulphate makes possible the preparation of highly basic, stable compounds, because without the presence of alkali metal sulphate titanium dioxide would be more easily flocculated.

By the use of these new titanium preparations in tanning processes not only white leathers but also colored leathers can be prepared, since it is known that titanium salts easily form color lakes. In this manner uniform dyeings are obtainable, the preparation of which is otherwise very difficult, since uniform dyeings are difficultly obtainable on account of the non-uniform texture of the skin.

The following examples illustrate our invention without limiting it thereto:

*Example 1.—Preparation of a tanning and weighting compound*

106 g. of sodium carbonate are introduced in small portions into a solution containing about 150 g. of titanium dioxide and 160 g. of sulphuric acid in each liter. By evaporation a white crystalline salt is obtained containing about 34% of titanium dioxide.

*Example 2.—Tanning prescription*

The skin is pickled with 1½% of hydrochloric acid and 8% of sodium chloride.

It is then tanned in a solution containing 4.5% of titanium dioxide. The skin is neutralized with 1% of sodium bicarbonate and it is fatted with 3% of sulphurized neat's-foot oil. A white soft leather is obtained thereby. The tanning agent is completely freed from the solution so that after tanning during 4 hours in a tanning vat no titanium is to be detected by means of hydrogen peroxide.

*Example 3*

A skein of degummed natural silk is introduced into a bath containing in one liter about 50 g. of $TiO_2$ in form of a basic sulphate as described in Example 1 at a temperature of about 35° C. and is then treated in the usual manner, that means it is exposed to the air, passed through different baths of the same concentration as above and is finally passed through a bath containing alkaline salts, such as sodium borate, phosphate or silicate. In this manner the silk has gained 50% of its original weight.

We claim:

1. Titanium sulphate preparations containing an alkali metal sulphate in which on each mol. of titanium dioxide 0.3 to 0.5 mol. of sulphuric acid are bound, being colorless crystalline powders, dissolving easily in water and being valuable tanning and weighting agents.

2. Titanium sulphate preparations containing sodium sulphate in which on each mol. of titanium dioxide 0.3 to 0.5 mol. of sulphuric acid are bound, being colorless crystalline powders, dissolving easily in water and being valuable tanning and weighting agents.

LUDWIG TEICHMANN.
HERMANN NOERR.